US 6,658,785 B1

(12) United States Patent
Faulkner et al.

(10) Patent No.: US 6,658,785 B1
(45) Date of Patent: Dec. 9, 2003

(54) LIVE BAIT FISH LURE

(76) Inventors: Fulton L. Faulkner, 1771A Alert Rd., Warrenton, NC (US) 27589; Kirk E. Faulkner, 9 Arnold Rd., Louisburg, NC (US) 27549

( * ) Notice: Subject to any disclaimer, the term of this patent is extended or adjusted under 35 U.S.C. 154(b) by 0 days.

(21) Appl. No.: 10/162,286

(22) Filed: Jun. 4, 2002

Related U.S. Application Data

(60) Provisional application No. 60/299,361, filed on Jun. 19, 2001.

(51) Int. Cl.⁷ .......................... A01K 85/00; A01K 83/06
(52) U.S. Cl. .......................... 43/44.2; 43/44.6; 43/42.36; 43/42.39
(58) Field of Search ................ 43/44.2, 44.6, 43/44.9, 42.36, 44.8, 42.39, 42.33

(56) References Cited

U.S. PATENT DOCUMENTS

| | | | | | |
|---|---|---|---|---|---|
| 4,422,260 A | * | 12/1983 | Perrick | ...................... | 43/44.8 |
| 4,791,751 A | * | 12/1988 | Francklyn | ................... | 43/44.6 |
| 4,869,014 A | * | 9/1989 | Francklyn | ................... | 43/44.6 |
| 4,932,154 A | * | 6/1990 | Andretti | ...................... | 43/44.6 |
| 5,177,895 A | * | 1/1993 | Baron | ........................ | 43/44.2 |
| 5,189,826 A | * | 3/1993 | Schlaegel | ................... | 43/44.6 |
| 5,329,720 A | * | 7/1994 | Baron | ........................ | 43/44.2 |
| 5,377,442 A | * | 1/1995 | Gariglio | ..................... | 43/44.4 |
| 5,505,016 A | * | 4/1996 | Baron | ........................ | 43/44.2 |
| 5,611,168 A | * | 3/1997 | Schultz | ....................... | 43/44.6 |
| 5,829,186 A | * | 11/1998 | Schultz | ....................... | 43/44.6 |
| 6,131,329 A | * | 10/2000 | Kageyama | ................. | 43/42.33 |

* cited by examiner

Primary Examiner—Kurt Rowan
(74) Attorney, Agent, or Firm—Mills Law Firm PLLC

(57) ABSTRACT

A lure for mounting bait fish includes a unitary weighted body having a socket for receiving the nose of the bait fish and a lower tail section having inwardly projecting hooks for penetrating the sides of the bait fish to effect a secure, properly oriented mounting.

15 Claims, 5 Drawing Sheets

FIG. 8
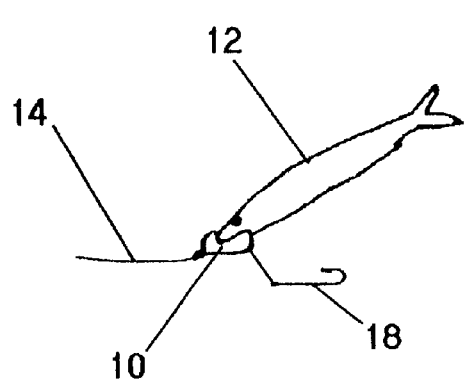
FIG. 9
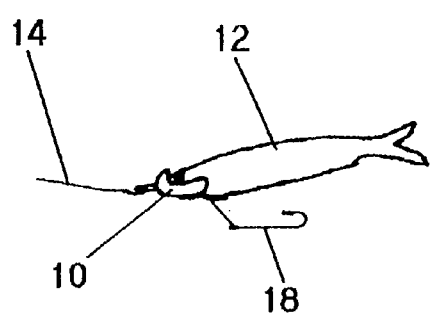
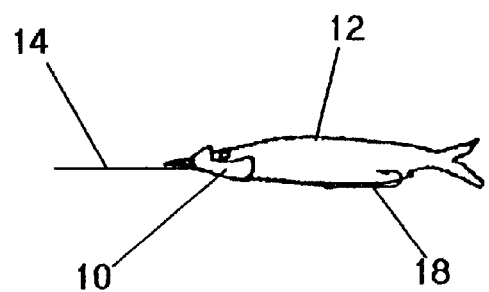
FIG. 10

LIVE BAIT FISH LURE

RELATED APPLICATIONS

This application claims the benefit under 35 USC 121 of U.S. Provisional Application No. 60/299,361 filed on Jun. 19, 2001 in the name of Faulkner et al. and entitled "Bait Fish Lure".

FIELD OF THE INVENTION

The present invention relates generally to fishing lures, and in particular to a lure for securely mounting a bait fish.

BACKGROUND OF THE INVENTION

In the sport fishing of various predator fish such as mackerel, wahoo, swordfish and the like, it is common practice to use as a lure an appropriate bait fish such as ballyhoo. Using accepted techniques, the hook line is manually wrapped around the bait fish and the hook barb attached to the tail. Oftentimes a sleeve is placed around the belly of the bait fish for additional support during the line attachment. In addition to being laborious, great skill and expertise is required to provide a lure attachment that will simulate the movement of the bait fish and accordingly provide the greatest enticement for the predator fish. Notwithstanding the above, the attaching gear detracts from desired natural appearance of the bait fish, particularly when the attaching procedure obscures the eyes of the bait fish, which many believe to present an artificiality to the lure that disinterests the target sport fish. Moreover, such mountings are highly prone to unnatural inversion during trolling.

For example, U.S. Pat. Nos. 5,829,186 and 5,611,168 to Schultz et al. disclose a fishing lure wherein the head of the fish is encased in a pair of barbed jaws that cover the eyes and detract from the attractiveness of the bait to the attacking fish. Similarly, U.S. Pat. No. 3,893,255 to Hicks discloses a plastic sleeve that encases the head of the fish. Although the sleeve is initially transparent and the head visible, the transparency decreases in the fishing environment and the effect is mitigated.

Other approaches for rigging bait fish involve mounting the head in an encircling collar as shown in U.S. Pat. Nos. 5,337,442 to Schultz and 4,233,771 to Robinson. Both are formed of plastic material creating problems in trolling stability and making it difficult to control the depth of the lure. A further approach as disclosed in U.S. Pat. No. 3,914,896 to Sahagian uses a pair of spring biased jaws to retain the body of the bait fish.

SUMMARY OF THE INVENTION

The present invention provides a lure that rapidly securely mounts the bait fish with a minimal obscuring of the bait fish profile, enables easy attachment of even multiple barbed hooks, and provides the hydrodynamics for maintaining natural upright orientation of the bait fish for low speed trolling and deeper water transit, as well as bottom positioning at rest. The bait fish lure has a unitary lead body having an apertured conical nose section for receiving and retaining the nose of a bait fish and a symmetrically flared tail section defining an upwardly trough for supporting the lower portion of the nose of the bait fish, while leaving the eyes of the bait fish exposed. Inwardly projecting hooks on the tail section penetrate and secure the body of the fish to the body. A leader line extends through a lower longitudinal passage in body and is attached at the trailing end to a barbed hook. The tail section of the lure presents a balanced weighted shape under trolling or static conditions and presents a consistent realistic profile of the bait fish. The tail section also creates a turbulent flow along the body of the bait fish imparting a natural swimming section to the tail of the bait fish. Upon a predator fish striking, the lure is free to break away from the fish a travel forwardly on the leader.

Accordingly, it is an object to provide a fish lure to which a bait fish may be readily and securely attached.

Another object is to provide a fish lure for billed bait fish that presents a natural appearance.

A further object is to provide a bait fish lure that is stable and upright under trolling and static conditions.

Yet another object is to provide a bait lure presenting a realistic appearance to an attached bait fish and imparting natural swimming movements thereto during movement.

DESCRIPTION OF THE DRAWINGS

The above and other objects and advantages of the present invention will become apparent upon reading the following description taken in conjunction with the accompanying drawings in which:

FIGS. 8 through 10 are schematic view of the sequential attachment of the bait fish to the lure.

DETAILED DESCRIPTION OF THE PREFERRED EMBODIMENTS

Figure 1:
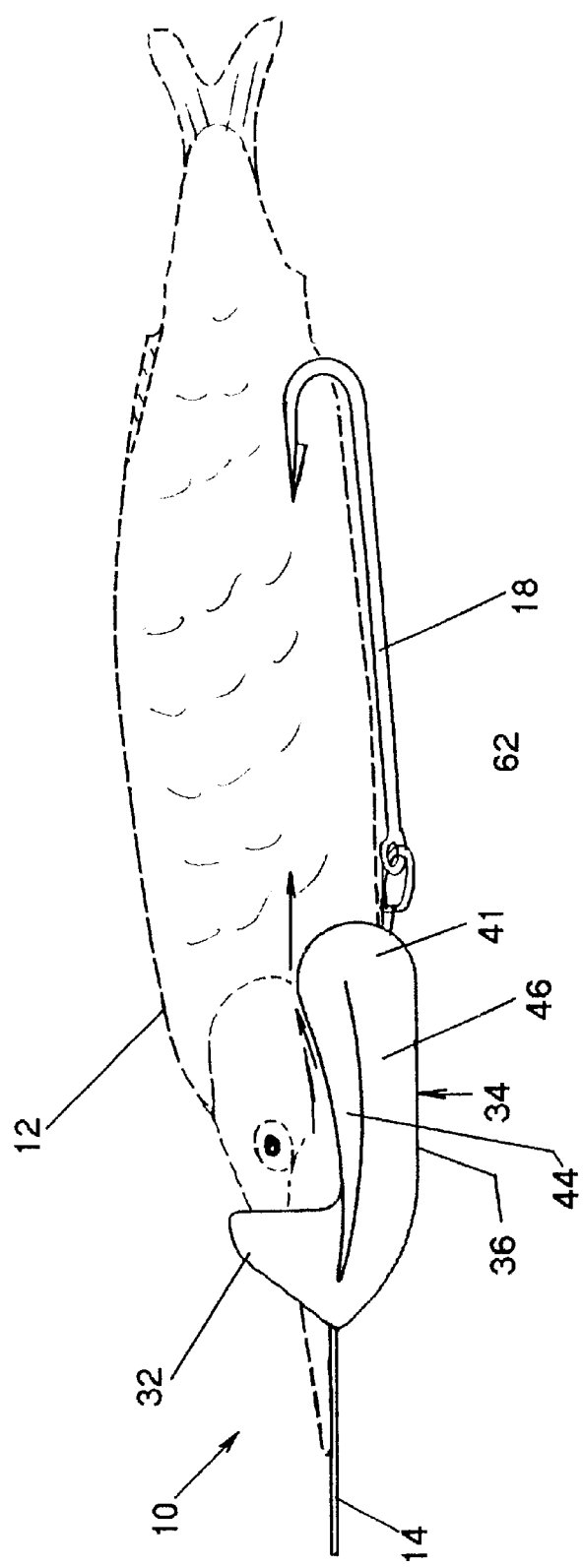
FIG. 1 is a side elevational view of a live bait fish lure in accordance with a preferred embodiment with a bait fish on the lure shown in dashed lines.

Referring to the drawings for the purpose of illustrating a preferred embodiment only and not for limiting same, FIG. 1 shows a live bait fish lure 10 carrying a bait fish 12, such as a ballyhoo, and operatively attached to a leader 14. The lure 10 terminates with a barbed hook 18 carried by the leader 14 and attached at the tail of the bait fish 12.

Referring additionally to FIGS. 2 through 7, the lure 10 comprises a unitary body 30 formed of a suitable material such as lead. The lure 10 includes a generally frustoconical frontal nose section 32 and a rearward tail section 34 carried on a lower body rib 36. The nose section 32 has an inner conical surface forming a ovate opening 38 blending with the upper surface of the rib 36. The tail section includes a pair of laterally spaced side wings 40. The wings 40 have a curved end walls 41 extending rearwardly beyond the end of the rib 36 to define a vertical rearwardly opening slot.

The side wings 40 have planar inner walls 42 diverging outwardly and upwardly from the side margins of the upper surface 43 of the rib 36. The upper surface of the rib has a lesser contour than the lower surface to more closely conform with the jaw profile of the bait fish. The side wings 40 have outer side walls comprising inwardly and upwardly converging upper sections 44 terminating and blending with the upper ends of the inner walls 42 and lower sections 46 converging downwardly and inwardly blending with the lower surface of the body rib 36. The inner walls 42 and the upper surface 43 of the rib 36 form a trough that engages and cradles the lower jaw of the fish head and terminate adjacent and beyond the gill area. The inner walls 42 are provided with inwardly projecting, slightly forwardly inclined, needle hooks 48 which penetrate the sides of the bait fish for securing the bait fish to the lure 10. The nose section 32 and outer walls of the tail section present a sculpted exterior surface blending with the contours of the bait fish. The wall surfaces establish a balanced hydrodynamic contour to the lure and provide a stable orientation at varying trolling speeds. They also provide a static balance to the lure for bottom fishing, correctly orienting the lure at rest. Further the symmetry, inclination and rounded termination of the wing sections impart a turbulent flow over the body of the bait fish, imparting a side-to-side action to the bait fish simulating natural swimming movements.

The nose section 32 is provided with the nose socket 50 for receiving the nose of the fish. A frontal hole 52 in the nose section 32 communicates with the socket 50 and facilitates attachment of billed bait fish, such as the ballyhoo.

Figure 3:
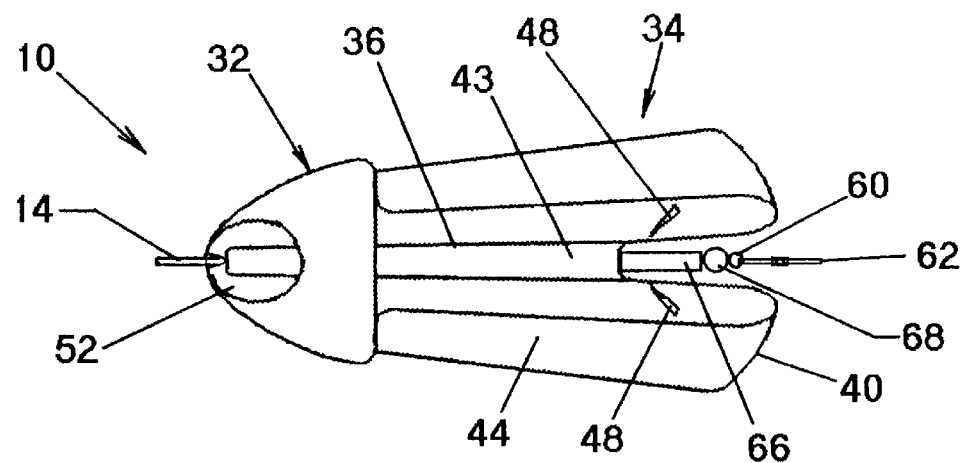
FIG. 3 is a top view of the live bait fish lure.
Figure 2:
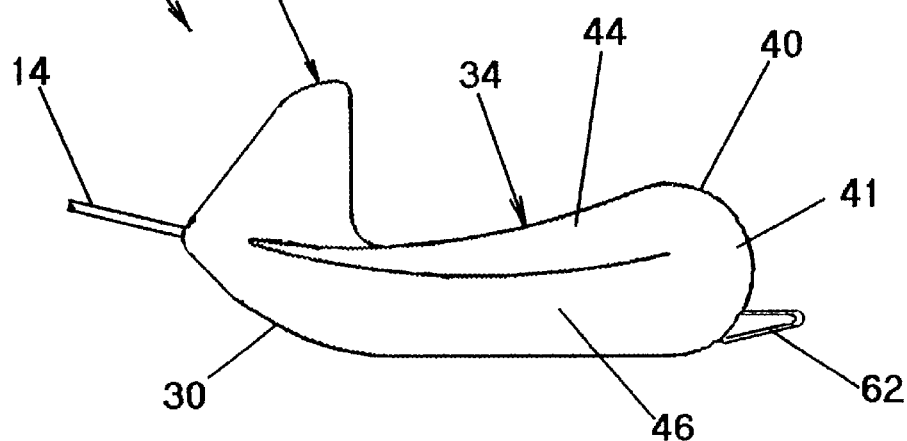
FIG. 2 is a side elevational view of the live bait fish lure shown in FIG. 1.
Figure 4:
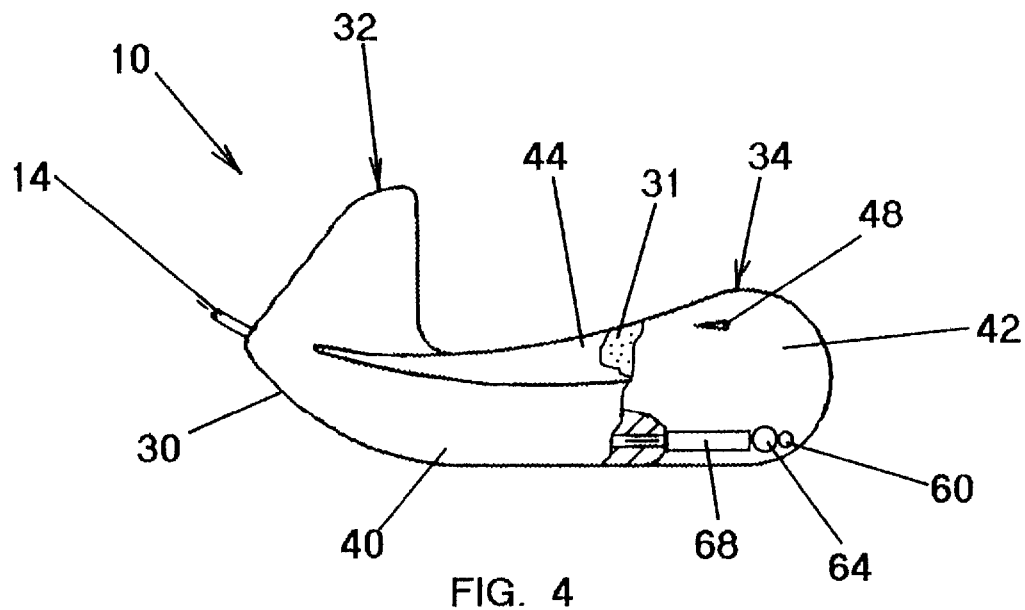
FIG. 4 is a partially sectioned side cross sectional view of the live bait fish with the leader illustrated.
Figure 5:
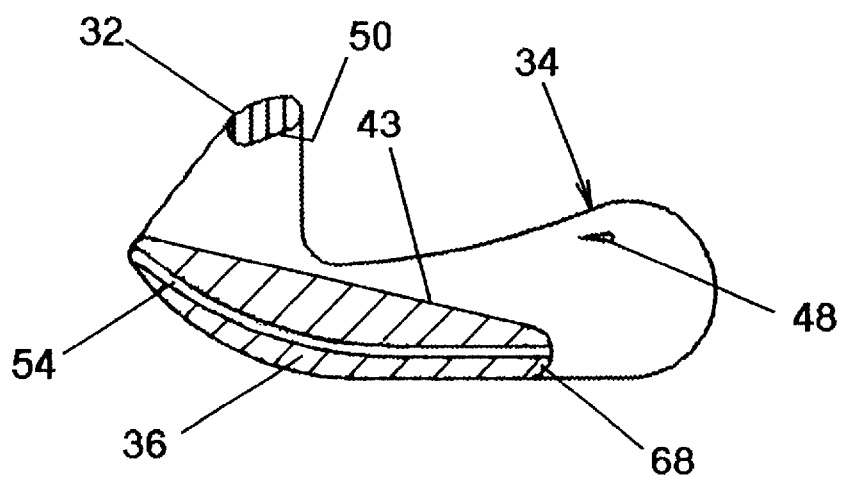
FIG. 5 is a sectioned side cross sectional view of the live bait fish lure with the leader removed.
Figure 6:
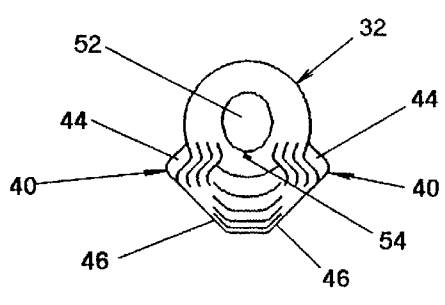
FIG. 6 is a front view of the live bait fish lure.
Figure 7:
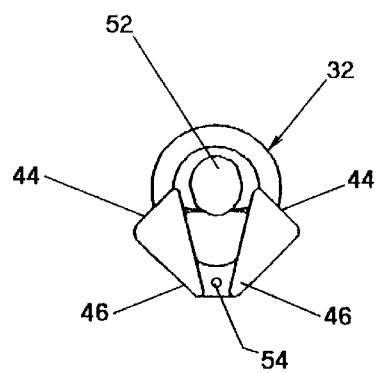
FIG. 7 is a rear view of the live bait fish lure.

As shown in FIG. 5, a leader passage 54 is centrally formed in the body rib 36. The lure 10 is thus slidably disposed on the leader 14 allowing the lure to break away from the bait fish during a strike and move freely along the length of the leader. Referring to FIGS. 3 and 4, the leader 14 is a typical construction, such as a copper wire having a trailing end terminated with a twisted loop 60 carrying a conventional snap fastener 62 to which the barbed hook 18 is attached. A ball member 64 having a diametral hole is threaded onto the leader 14 and covers the coils at the loop 60. The ball member 64 reinforces the end of the loop during to prevent kinking of the leader line. A cylindrical ferrule 66 is threaded onto the leader between the rear wall 68 of the rib 36 and the ball member 54. The front end of the ferrule 56 engages the rear wall 58 of the rib 36 to limit rearward travel of the lure and provide the propelling engagement surface for forward movement of the lure, while accommodating the above mentioned break away sliding of the lure.

For providing stable, simulated movement of the bait fish, the lateral sides of the lure are upwardly and rearwardly flared to provide stabilizing surfaces. The bottom surface 54 is rearwardly circumferentially flared for reducing drag while trolling. The weight of the lure and attachment to the bait fish allow the baited lure to sink toward bottom depths while maintaining an erect, natural appear horizontal profile.

As shown in FIGS. 8 through 10, the lure 10 cradles and carries the beak and head of the bait fish 12. The head of the bait fish 12 is initially inserted into the rearwardly opening socket on the nose section of the lure 10 with the bill of the bait fish extending through the frontal opening of the socket. The fish 12 is initially inserted into the socket at a shallow angle of about 30° as shown in FIG. 8. Thereafter, as shown in FIG. 9, the body of the fish is pivoted downwardly whereat inwardly projecting needle hooks 48 penetrate the sides of the fish, thereby capturing the later and maintaining orientation of the fish 12 with respect to the lure. The hook 18 is conventionally attached at the tail of the fish as shown in FIG. 10. As a result, the bait fish 12 is readily conveniently and securely positioned on the lure 10 with the fish bearing a clear profile with the eyes visible.

It will thus be appreciated that the bait fish lure as described above overcomes the extensive limitations of prior bait fish mountings and provides a natural appearing bait fish attachment that presents the baited lure to the sport fish in an enticing disposition.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from is the sprit and scope of the present invention. The disclosures and description herein are intended to be illustrative and are not in any sense limiting of the invention, which is defined solely in accordance with the following claim.

What is claimed:

1. A bait fish lure comprising: a unitary body including a lower medial rib having a forward end and a rearward end, said rib having an apertured nose section at a forward end and a pair of laterally spaced, vertically extending wing sections attached to said nose section and the rearward end of said rib, said medial rib having an upper surface substantially planar between said forward end and said rearward end, said nose section with said wing sections defining a trough for receiving the head of a bait fish with the eyes thereof rearwardly of the nose section and above the wing sections, symmetrically disposed downwardly and outwardly flared upper surfaces on said wing sections for balancing said body during forward movement and imparting turbulence along the-body of the bait fish for imparting simulated natural movement to the tail thereof, symmetrically disposed upwardly and outwardly lower surfaces flaring from said medial rib to said upper surfaces for promoting hydrodynamically stable forward movement to said lure, a plurality of inwardly projecting hooks on said inner surface of said wing sections for penetrating the side of the bait fish; said wing sections extending beyond said rearward end of said medial rib forming a rearwardly opening groove; and means for connecting a leader at a said nose section and a barbed hook at the rearward end of said medial rib.

2. The bait fish lure as recited in claim 1 wherein said wing sections terminated with a curved trailing end for promoting turbulent flow over the bait fish.

3. The bait fish lure as recited in claim 1 wherein said unitary body is a lead based casting.

4. The bait fish lure as recited in claim 1 wherein said hooks are positioned to contact the head of the bait fish adjacent the gills thereof.

5. The bait fish lure as recited in claim 1 wherein said hooks are generally triangular and forwardly inclined.

6. The bait fish lure as recited in claim 1 including a leader line extending through a passage formed in said rib, said leader line having an outer end extending rearwardly thereof, an end loop at the rearward end said leader line, an apertured ball member slidably carried on said leader line and engaging said loop, and a cylindrical ferrule carried on said leader line between said ball member and said rearward end of said medial rib.

7. The bait fish lure as recited in claim 6 wherein said longitudinal passage extends from a lower portion of said nose section through said rearward end of said medial rib and said leader line extends therethrough whereby said body is slidably supported on said leader line.

8. The bait fish lure as recited in claim 7 wherein said ferrule engages said rearward end of said medial rib.

9. A bait fish lure comprising: a unitary body including a frustoconical nose section having an opening therein, said nose section having a recessed rear surface configured for receiving the head of a ballyhoo with the bill thereof projecting forwardly through said opening and the eyes thereof located rearwardly of said nose section, a rib section extending rearwardly from said nose section below said opening and having a rearward end terminating beyond the gills of a ballyhoo positioned at the nose section, wing sections extending upwardly from the sides of said rib section and rearward of said nose section forming a trough to receive the head of the ballyhoo; a passage for slidably receiving a leader line therethrough, said passage formed in said nose section and said rib section and having an entry at said opening and an exit at said rearward end of said rib section, a plurality of forwardly and inwardly projecting hooks on said inner surfaces of said wing sections for penetrating the sides of the ballyhoo behind the gills whereby the ballyhoo may be secured on said body by inserting the bill through said opening and said head into said recess followed by rearward movement of the ballyhoo to engage the hooks with the body thereof.

10. The bait fish lure as recited in claim 9 wherein said wing sections include symmetrically disposed downwardly and outwardly flared upper surfaces for balancing said body during forward movement and imparting turbulence along the body of the bait fish for imparting simulated natural movement to the tail thereof.

11. The bait fish lure as recited in claim 10 wherein said wing sections include symmetrically disposed upwardly and outwardly lower surface flaring from said medial rib to said upper surface for promoting hydrodynamically stable forward movement to said lure.

12. The bait fish lure as recited in claim 11 wherein the upper surface of said medial rib is substantially planar between said forward end and said rearward end.

13. The bait fish lure as recited in claim 11 wherein said wing sections extend beyond said rearward end of said medial rib forming a rearwardly opening groove in which said termination means are disposed.

14. The bait fish lure as recited in claim 13 wherein said wing sections terminated with a curved trailing end for promoting turbulent flow over the bait fish.

15. The bait fish lure as recited in claim 10 wherein said unitary body is a lead based casting.

\* \* \* \* \*